United States Patent [19]
Bemelmann et al.

[11] 3,727,289
[45] Apr. 17, 1973

[54] DEVICE FOR CLAMPING AND MOVING TOGETHER THERMOPLASTIC PIPES FOR FLUSH-WELDING

[75] Inventors: Karl Bemelmann, Bad Soden/TS; Hubert Koch, Okarhen both of Germany

[73] Assignee: Messer Griesheim GmbH, Frankfurt am Main, Germany

[22] Filed: Sept. 3, 1970

[21] Appl. No.: 69,357

[30] Foreign Application Priority Data

Sept. 18, 1969 Germany....................P 19 47 285.6

[52] U.S. Cl. ..................29/237, 156/158, 156/304, 156/503, 285/21
[51] Int. Cl.......B23p 19/04, B29c 27/00, F16l 13/02
[58] Field of Search.....................156/153, 157, 158, 156/304, 503; 285/21–22; 29/237

[56] References Cited

UNITED STATES PATENTS

| 3,618,845 | 11/1971 | Totten | 285/21 X |
| 3,039,181 | 6/1962 | Sawdey | 29/237 |

Primary Examiner—Philip Dier
Attorney—Connolly and Hutz

[57] ABSTRACT

A device for heating pipes which are to be flush welded includes two hinged clamps each of which is connected to a supporting piece. One of the supporting pieces is attached to a guide pin with the other supporting piece movably mounted thereon.

4 Claims, 2 Drawing Figures

DEVICE FOR CLAMPING AND MOVING TOGETHER THERMOPLASTIC PIPES FOR FLUSH-WELDING

BACKGROUND OF INVENTION

In the flush welding of pipes made of thermoplastic material a heating element is used wherein the pipe ends are first pressed against a so-called heating mirror in order to heat the welding point or edges to a welding temperature. After the welding temperature is reached, the heating mirror is again removed and both pipe ends are welded together by being pressed against each other. For the quality of the welding connection, a precise and uniform contact pressure is of decisive importance.

It has been shown that welding of sufficient endurance strength may be achieved when the contact pressure is between 1 and 2 $kp/cm^2$, and preferably 1.5 $kp/cm^2$. With a lesser contact pressure there results only an insufficient welding, while a greater pressure effects an excessive displacement of the pasty material, so that at the impact point there exists only an excessively cool material, which leads to an insufficient welding.

For the flush welding of large diameter pipes made of synthetic material, there is already known a stationary device (German Des. Pat. No. 1,963,280) wherein both of the pipe ends to be welded together are clamped in clamps, of which one clamp is stationary and the other clamp is supported movably in the carriage of a frame. The moving of the movable clamp occurs by means of a pressure medium cylinder. Such a difficult and complicated arrangement, however, is not suitable for the welding of synthetic material pipes of smaller diameter in narrowed space conditions.

In a further known device for the flush-welding of synthetic material pipes (Ger. Des. Pat. No. 1,933,319), both clamps are pressed together manually by means of a forked lever constructed as double cutting shears. In addition here, there are arranged laterally two springs for the production of the pressing force required in heating and welding. Even this device may not be employed for the welding of smaller pipes. For their operation, there are required at least two servicing personnel. Furthermore, it is disadvantageous that the two clamps have no acceptable reciprocal guideways. In addition, the adjustment of the spring force may be only undertaken inaccurately. Due to its projecting manner of construction, the device is further limited regarding its applicability.

In a similar device (German published application No. 1,479,232) the forked lever is replaced by two pressure medium cylinders. Even this device, however, is not suitable for the welding of smaller pipes. In this respect both clamps also have no guideways reciprocally and there result consequently dissimilar contact pressures, since these are under the same pressure which along must be applied as the moving force for the pressure medium cylinders.

According to a further known device (German Des. Pat. No. 6,803,118), both clamps are pressed against each other by means of parallel guide rods over pressure medium cylinders or a spindle. Even here, there does not result an acceptable guiding of both clamps toward each other. Moreover, this arrangement requires at least two servicing personnel, and its manner of construction results in projections in such a manner that it may not be applied in narrowed space conditions.

A further device of this type (German Des. Pat. No. 1,844,421) consists of several individual parts which are connected together only prior to each welding process. This arrangement utilizes the reciprocal pulling of both clamps by way of a simple bolt lever. There is, however, provided no guideways for the clamps, unless the pipes are conducted on fixed supports. An adjustment of the contact pressure is impossible; moreover, the welding material solely depends on the manual readiness of the servicing person. Without an additional support, this device must also be serviced by only two persons. The device is suitable practicably only for the welding of horizontally situated pipes.

SUMMARY OF INVENTION

An object of this invention is to provide a simple device which overcomes the above-mentioned disadvantages.

A further object is to provide such a device which may be operated by a single individual and may also be used in narrow spaces, particularly during installation work.

A still further object is to provide such a device which assures a precise contact pressure during the welding and also during the heating and which is not dependent on the manual dexterity of the operator.

In accordance with this invention a device for the heating element in flush welding of pipes consisting of synthetic material, is characterized by two hinged pipe clamps which are each connected to a support piece. One support piece is attached to a guide pin on which the other support piece may be moved with the movement occurring by means of a spindle drive whose spindle is turnably supported in the one supporting piece and whose spindle nut is axially movable in the other supporting piece. This design provides an unexpectedly simple construction which may be easily operated by one operator and, above all, may be used in narrow spaces, for example in laying synthetic material pipes in room corners. Both clamps are securely guided toward each other by means of guide pins which of necessity assures a precise guiding of the pipe ends toward each other, the activation occurring by means of a simple worm gear spindle.

In a further development of the invention, it is suggested that for a double guidance there be arranged a further guide pin between both supporting pieces.

It is also of advantage that pipe clamps of different size be attached at the supporting pieces. The pipe clamps may thus be simply exchanged in accordance with the diameter of the particular pipe to be welded without requiring extensive work for this purpose.

In addition, it is possible that the pipe clamps are inserted into grooves of the supporting pieces, shaped accordingly, by means of swallow-tail-shaped or wedge-shaped lugs and are attached by means of screws.

In a particularly advantageous form of the invention the spindle nut is shaped in the form of a piece of pipe, which at at its end facing the spindle has an annular flange for pushing against the supporting piece of the movable pipe clamp, while its other end is provided with outside threading on which a spring seat is movable by means of its threaded engagement therewith. Concentrically between the spring seat and the pipe-like nut is a spring attached to the nut at one end while its other end acts against the supporting piece of the movable pipe clamp. In this connection, it is furthermore advantageous that the spring be externally covered by a jacket, provided with a scale, which is telescopically arranged to the spring seat. The above-mentioned design makes it possible in the simplest kind and manner to pre-set, before the beginning of the heating up process, a precise contact pressure force over the spring seat and at the same time over the annular flange of the spindle nut to limit the distance which is reciprocally covered by both pipe ends during the heating up process as well as during the welding. There consequently results during the heating up process, as well as during the welding, always a precisely predetermined degree of contact pressure and also the telescoping of the pipe frontal surfaces occurring during welding is also precisely limited, whereby a satisfactory and clean welding seam occurs such as previously had been impossible with the known apparatus.

An additional characteristic of the invention is also that swivel toggles, known per se, are provided for the closing of the pipe clamps and are so arranged that their toggles are situated toward the service side in the direction of the supporting pieces. The device, among other places, can also be used without difficulty in room corners by this means. This is particularly noteworthy since with the previously known devices this use was impossible because the swivel toggles or mounting screws were generally so arranged that in welding, for example, of pipes in room corners, they could not be activated at all or only with great difficulty.

THE DRAWINGS

DETAILED DESCRIPTION

Figure 2:
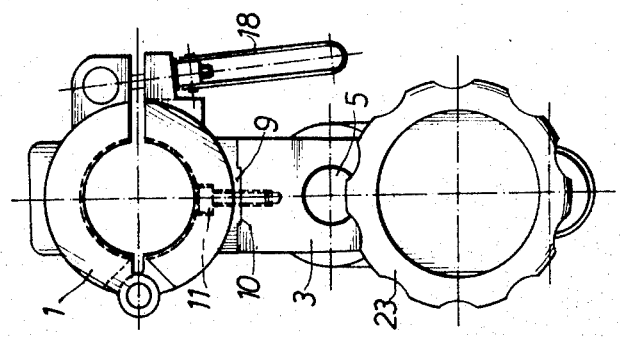
FIG. 2 is a front view of the device shown in FIG. 1.

The device consists of the two pipe clamps 1 and 2, which are attached to the support pieces 3 and 4. Both support pieces 3 and 4 are connected together by means of a guide pin 5. Guide pin 5 is attached to the supporting piece 3 in the illustrated embodiment while the supporting piece 4 is movably supported on the guide pin 5 in the direction of arrow 19. The ball bearings are indicated by 22 by means of which easy movability of the supporting piece 4 is assured. An activating spindle 6 having a hand wheel 23 is supported in the supporting piece 3. The other end of spindle 6, by means of pin 24 and groove 25 cooperates with a spindle nut 7 constructed like a pipe piece. This spindle nut has at its front end 7a an annular flange 12 which acts as a stop vis-a-vis the supporting piece 4. The other end 7b of the spindle nut 7 is provided with an external threading 13 on which a spring seat 14 is screwed on by means of a corresponding counterwinding or threading. The spring seat is also movable back and forth in the direction of arrow 19 and acts on a spring 17 with one of its ends supported against supporting piece 4. On the outside, spring 17 is closed off by a jacket 16 on which a scale 15 is provided for setting the pressing force.

A further guide pin 8 is also mounted in the supporting piece 3 of the illustrated exemplary embodiment, while supporting piece 4 is conducted on the guide pin 8. By this means there results in connection with guide pin 5 a simple and secure double guideways.

Figure 1:
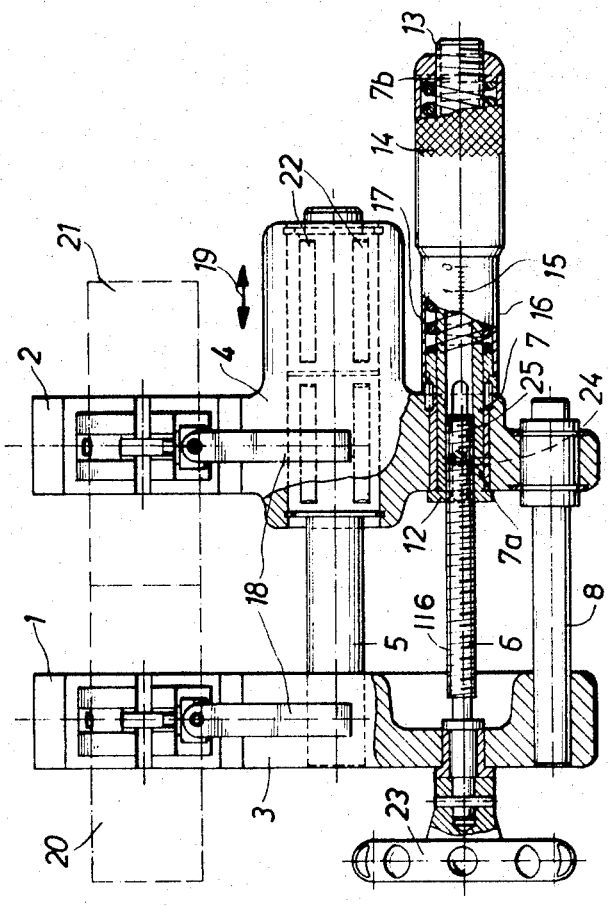
FIG. 1 is a side view of the novel device, partially in cross-section.

Swivel toggles are designated with 18 by means of which a releasing and securing of both halves of the pipe clamps 1 and 2 is undertaken. The pipe ends to be clamped together are indicated in FIG. 1 with 20 and 21.

The manner of operation of the novel device is as follows: First by releasing the swivel toggle 18, both pipe clamps 1 and 2 are opened. After the swinging away of the upper halves of the clamps, from the lower halves, both pipe ends 20 and 21 may be placed into the respective openings of the pipe clamps. Then the upper halves of pipe clamps 1 and 2 are again turned down and clamped by means of toggles 18. The setting of the pressing force during the heating up process and the subsequent welding process occurs in that the spring seat 14 is rotated until its front edge is at the desired value on scale 15 of jacket 16. By turning hand wheel 23, the supporting piece 4 with pipe clamp 2 and pipe end 21 is then moved. A suitable heating mirror (not shown) is adapted to be pivoted between both pipe ends 20 and 21 which are moved toward each other until both frontal surfaces of pipe ends 20 and 21 abut the heating mirror or element. Any suitable conventional heating element may be used, such as disclosed in U.S. Pat. Nos. 3,013,925 and 2,379,806 or in German Patent No. 1,844,421.

Now hand wheel 23 is rotated until the annular flange 12 of spindle nut 7 is spaced by a small factor or small distance from the supporting piece 4. At this moment the force of spring 17 set by means of spring seat 14 effects supporting piece 4 and consequently pipe ends 20 and 21 by means of clamps 1 and 2. In this respect since flange 12 no longer abuts against supporting piece 4, the entire preset force of spring 17 causes pipe 21 to press against pipe 20. After heating by the heating element, the supporting piece 4, by turning of hand wheel 23, is spaced from the heating mirror or element to such an extent that the heating element may be removed from between both pipe ends. Then, by turning hand wheel 23, support piece 4 is again moved in the opposite direction until both pipe ends 20 and 21 meet. With the further turning of hand wheel 23, annular flange 12 of spindle nut 7 is once again spaced from the supporting piece 4 and the required contact pressure this time for the welding of pipe ends 20 and 21 is achieved, in that by way of hand wheel 23 and spindle 6 the spindle nut 7 with the spring seat 14 is moved on the supporting piece 4 until the upper edge of the spring seat 16 lies on the desired scale value of jacket 16. After the welding, clamps 1 and 2 are again released by means of the swivel toggle 18 and the device may be removed from the welding position.

The movement of pipe clamps 1 and 2 at supporting pieces 3 and 4 occurs for one reason due to the dovetail or wedge-shaped lugs 9 of pipe clamps 1 and 2 which are inserted into the grooves 10 of support pieces 3 and 4 and are shaped accordingly thus causing parts 9 and 10 to mate as shown in FIG. 2, and for another reason by means of screws 11 which lock each clamp to its supporting piece.

As previously described and as is apparent from the drawings, the inventive device operates in the following manner. Prior to the heating operation pipes 20 and 21 are spaced from each other. The spring tension is set by manipulating spring seat 14. Since spring 17 reacts against supporting piece 4 the supporting piece is urged to the left as shown in FIG. 1. The movement of piece 4 is prevented by its abutment against flange 12. The suitable heating element is inserted between pipes 20 and 21 and the pipe 21 is brought toward pipe 20 by rotating handle 23 which causes nut 7 to move toward the left in FIG. 1 by its engagement with spindle 6. By bringing pipe 20 toward pipe 21, since the heating element is therebetween, each pipe is caused to contact the heating element and permitted to remain in contact therewith until the pipe ends are sufficiently softened. To assure that the full force of spring 17 (in accordance with its preset valve) being utilized, handle 23 is rotated until pipe 21 makes contact with the heating element and the rotation is continued until flange 12 becomes slightly spaced from supporting piece 4. After the pipe ends are sufficiently softened, handle 23 is then rotated in the opposite direction whereby flange 12 again contacts the supporting piece 4. This reverse movement of handle 23 thus moves pipe 21 and its supporting piece 4 toward the right in FIG. 1 away from pipe 20 and the heating element, whereby the heating element can be removed. Handle 23 is then again rotated in a direction so the pipe 21 is again moved toward pipe 20 until the pipes 20 and 21 contact each other. The rotation of handle 23 continues until flange 12 is slightly spaced from supporting piece 4. The contacting pipes with their softened ends are thereby joined together and the clamps are removed.

What is claimed is:

1. A device for clamping and moving pipes made of synthetic materials whereby the pipes may be welded together by the heated tool welding method, said device comprising
   a. a first and a second pipe clamp, each pipe clamp having a lower part and swingably connected thereto an upper part;
   b. first and second supporting means, whereby said first supporting means being connected to said lower part of said first pipe clamp and said second supporting means being connected to said lower part of said second pipe clamp;
   c. a guide pin, one end of said guide pin being fixedly mounted in said first supporting means and the other end of said guide pin being movably mounted in said second supporting means;
   d. a spindle drive for moving at least one of said supporting means toward and away from the other of said supporting means;
   e. said spindle drive including a threaded spindle, a nut, and spindle rotating means;
   f. said nut being mounted in one of said supporting means;
   g. one end of said threaded spindle engaging said nut, and
   h. the other end of said threaded spindle being rotatably supported in the other of said supporting means, and being connected to said spindle rotating means.

2. The device of claim 1 including a further guide pin between said supporting means whereby said guide pin and said further guide pin comprise a double guideways.

3. The device of claim 1 wherein said nut is of pipe shape construction, said nut having an annular flange at its end disposed toward said spindle and abutting against its supporting piece, the other end of said nut being externally threaded, a spring being around said nut, a spring seat threadably engaged with said threaded nut end for pressing against one end of said spring, and the opposite end of said spring reacting against its supporting piece.

4. The device of claim 3 wherein a jacket is disposed over said spring, said spring seat being telescoped over said jacket, a scale of indicia on said jacket, and mounting means for movably mounting said spring seat over said indicia to indicate the amount of compression of said spring.

* * * * *